US007863773B2

(12) United States Patent
Bourgeau et al.

(10) Patent No.: US 7,863,773 B2
(45) Date of Patent: Jan. 4, 2011

(54) APPARATUS FOR THE REDUNDANT POWER SUPPLY OF AT LEAST ONE LOAD

(75) Inventors: Ed Bourgeau, Houston, TX (US); Jörg Flottemesch, Bubenreuth (DE); Jürgen Moser, Forchheim (DE)

(73) Assignees: Siemens AG, Munich (DE); Transocean Offshore Deepwater Drilling Inc., Houston, TX (US)

( * ) Notice: Subject to any disclaimer, the term of this patent is extended or adjusted under 35 U.S.C. 154(b) by 850 days.

(21) Appl. No.: 11/401,624

(22) Filed: Apr. 11, 2006

(65) Prior Publication Data
US 2007/0069583 A1    Mar. 29, 2007

(30) Foreign Application Priority Data
Sep. 23, 2005    (DE)    ............ 10 2005 047 686

(51) Int. Cl.
*H02J 9/00* (2006.01)
(52) U.S. Cl. ...................................... 307/64
(58) Field of Classification Search ............ 307/65, 307/64
See application file for complete search history.

(56) References Cited

U.S. PATENT DOCUMENTS

| 5,530,636 | A | * | 6/1996 | Brown ............ 363/97 |
| 5,612,581 | A | | 3/1997 | Kageyama |
| 6,031,298 | A | * | 2/2000 | Lo et al. ............ 307/64 |
| 6,046,915 | A | * | 4/2000 | Jacobs et al. ............ 363/39 |
| 6,449,173 | B1 | | 9/2002 | Bruner |
| 6,465,909 | B1 | | 10/2002 | Soo et al. |
| 6,528,903 | B2 | | 3/2003 | Steinke |
| 6,747,369 | B2 | | 6/2004 | Griffith et al. |
| 7,057,376 | B2 | * | 6/2006 | Cook et al. ............ 323/207 |
| 7,432,615 | B2 | * | 10/2008 | Hjort ............ 307/64 |

(Continued)

FOREIGN PATENT DOCUMENTS

DE    93 01 877.0 U1    3/1994

(Continued)

OTHER PUBLICATIONS

Complete English language translation and English language summary of : Weinhold et al.: "Leistungselektronik kontrolliert Leistungsflüsse in Verteilungsnetzen" (Advanced power flow control for distribution networks), Siemens AG, Erlangen, Fachthema Stromrichter, pp. 62-67, 2001.

(Continued)

*Primary Examiner*—Robert L. DeBeradinis
(74) *Attorney, Agent, or Firm*—Laurence A. Greenberg; Werner H. Stemer; Ralph E. Locher

(57) ABSTRACT

In order to provide an apparatus for the redundant power supply of at least one load having a first converter, which can be connected to a first AC voltage system via a first connection, a second converter, which can be connected to a second AC voltage system via a second connection, and a DC voltage intermediate circuit, which connects the first converter to the second converter on the DC voltage side, which apparatus makes a redundant power supply possible, the invention proposes that the DC voltage intermediate circuit has at least one load connection for the purpose of supplying power to a load.

17 Claims, 6 Drawing Sheets

U.S. PATENT DOCUMENTS

| | | |
|---|---|---|
| 2004/0036359 A1 | 2/2004 | Griffith et al. |
| 2004/0155527 A1* | 8/2004 | Bryde ................... 307/64 |
| 2005/0141184 A1* | 6/2005 | Suzuki et al. ........... 361/683 |
| 2005/0168073 A1 | 8/2005 | Hjort |
| 2006/0017328 A1* | 1/2006 | Bryde ................... 307/64 |
| 2007/0258178 A1* | 11/2007 | Hallak et al. ........... 361/93.7 |

FOREIGN PATENT DOCUMENTS

| | | |
|---|---|---|
| DE | 94 13 638 U1 | 12/1995 |
| DE | 103 40 625 A1 | 4/2005 |
| EP | 1 195 877 A1 | 4/2002 |

OTHER PUBLICATIONS

Russian Office Action received on Oct. 2, 2009.

* cited by examiner

APPARATUS FOR THE REDUNDANT POWER SUPPLY OF AT LEAST ONE LOAD

BACKGROUND OF THE INVENTION

Field of the Invention

The invention relates to an apparatus for the redundant power supply of at least one load having a first converter, which can be connected to a first AC voltage system via a first connection, a second converter, which can be connected to a second AC voltage system via a second connection, and a DC voltage intermediate circuit, which connects the first converter to the second converter on the DC voltage side.

An apparatus of that type is described in German published patent application DE 103 40 625 A1. There, the apparatus has a first pulse-controlled converter and a second pulse-controlled converter, the pulse-controlled converters being connected to one another via a DC voltage intermediate circuit. Each pulse-controlled converter comprises a so-called 6-pulse bridge circuit having power semiconductors which can be switched off. Such apparatuses, which are also known as a back-to-back link, are used in power distribution systems for the purpose of coupling power distribution transmission systems. It is thereby possible for the power distribution systems to have different frequencies, voltage levels, star point connections, or phase angles.

Apparatuses for redundant power supply are used, for example, on drilling vessels or on drilling platforms. Drilling vessels and drilling platforms are therefore known which are not anchored at relatively great water depths during drilling operations but are positioned dynamically by means of so-called thrusters. These thrusters are in the form of drives which can be adjusted in terms of the rotational speed and the azimuth angle, which makes precise positioning of the drilling vessels or drilling platforms possible without any anchoring. A failure of the power supply for more than 45 seconds can lead to high costs since, in such a case, the drill column required for carrying out the drilling would need to be mechanically decoupled and coupled together again once the drilling vessel or the drilling platform has been repositioned. In order to drive such motors or drives, a reliable power supply is thus required. For this reason, drilling vessels and/or drilling platforms are generally equipped with a redundant power supply system. In addition to these two power supply systems, an emergency power supply system is generally provided to which it is possible to change over in the event of a fault. Each power supply system is fed power via dedicated generators. A mechanical switch is used, for example, for the purpose of coupling the power supply systems. However, this coupling is associated with the disadvantage that the faulty power supply system can disadvantageously influence the fault-free power supply system. However, this is undesirable. It is also known for a drive, whose rotational speed can be altered, to be connected to both power supply systems via changeover switches, in place of a switch. However, such a connection takes time, which may result in faulty positioning during the transition phase when switching over.

SUMMARY OF THE INVENTION

It is accordingly an object of the invention to provide an apparatus for providing redundant power to one or more loads which overcomes the above-mentioned disadvantages of the heretofore-known devices and methods of this general type and which makes an improved redundant power supply possible.

With the foregoing and other objects in view there is provided, in accordance with the invention, an apparatus for the redundant power supply of at least one load, comprising:

a first converter selectively connectible to a first AC voltage system via a first connection;

a second converter selectively connectible to a second AC voltage system via a second connection; and a DC voltage intermediate circuit connected between said first converter and said second converter on a DC voltage side thereof, said DC voltage intermediate circuit having at least one load connection for supplying power to a load.

In other words, the invention achieves this object by the DC voltage intermediate circuit having at least one load connection for the purpose of supplying power to a load.

According to the invention, the apparatus known, for example, under the term back-to-back link is no longer used for coupling second systems. Instead, the provision of a load connection, which is connected to the DC voltage intermediate circuit, makes possible the redundant power supply of a load which can be connected to the load connection. Such an apparatus is therefore particularly suitable for installation on drilling vessels or drilling platforms which are equipped with drives, which can be adjusted in terms of the rotational speed and the azimuth angle, such as the so-called thrusters, for the purpose of positioning the drilling vessels or drilling platforms at great water depths. It is thus possible, for example, for power to be supplied to the loads connected to the DC voltage intermediate circuit from the second AC voltage system during normal operation, the power supply to the loads being taken over by the first AC voltage system in the event of a failure of the AC voltage in said second AC voltage system. According to the invention, the converters expediently have power semiconductors which can be switched off, such as GTOs or IGBTs. The power semiconductors which can be switched off are clocked, for example, in the kilohertz range by means of pulse-width modulation, with the result that correspondingly short transition times are made possible when switching over from the second AC voltage system to the first AC voltage system. At such short switchover times, erroneous positioning is reliably prevented.

The converters in the context of the invention are in principle regulated as desired.

In accordance with one expedient further development, however, the first converter has first DC voltage regulation for the purpose of regulating a DC voltage of a DC voltage intermediate circuit. In this case, the first converter is used for building up an expedient DC voltage in the DC voltage intermediate circuit.

In accordance with one expedient further development, the second converter has power regulation for the purpose of regulating the power flow via the second converter, the power being regulated to a negative desired DC power, whose absolute value corresponds to the absolute value of the power consumed by all of the loads. In accordance with this advantageous further development, the power supply to the loads connected to the DC voltage intermediate circuit takes place by means of the second AC voltage system, the power being regulated to a negative desired DC power. In particular in the case of the use of motors as the load, whose consumed power changes continuously over time, it is therefore expedient to use measuring sensors for the purpose of measuring the power consumed on the load side. For example, calibrated voltage and current transformers are connected upstream of the load connection, it being possible for the output signals from said voltage and current transformers to be used to measure the power consumed by the loads. By means of regulation, the negative desired DC power having the same absolute value is determined from the consumed power measured and is used as the desired value in the power regulation. The loads are thus supplied with power by means of the second power supply system.

The first converter, on the other hand, is used for the purpose of maintaining the DC voltage in the DC voltage intermediate circuit and for the purpose of simultaneously controlling the wattless power in the first AC voltage system. In the event of a failure of the second AC voltage system, the first converter corrects the DC voltage of the DC voltage intermediate circuit virtually without delay despite the lack of power supply, with the result that there is no noticeable interruption to the power supply for the loads despite the failure of the second AC voltage system. However, with this refinement of the invention, a failure of the first AC voltage system would result in failure of the DC voltage in the DC voltage intermediate circuit, which would rule out further driving of the loads.

For this reason, one further development of the invention provides for the second converter to have second voltage regulation for the purpose of regulating the voltage in the DC voltage intermediate circuit. Since, in accordance with this further development, the two converters regulate the DC voltage of the DC voltage intermediate circuit, all of the loads can be supplied equally from the two systems. Failure of one system—whichever system it is—would thus not have any lasting effect on the drive, since the respectively intact AC voltage system takes over the power supply to the loads. The duration of the transition of the power supply from one AC voltage system to the other AC voltage system is in the region of a few milliseconds according to the invention. It is possible to prevent the converters from influencing one another owing to oscillations in the DC voltage intermediate circuit by means of suitably selecting the regulating parameters. The current regulators are therefore expediently designed so as to prevent overshooting or mutual influencing of the converters. Such regulation methods are known to those skilled in the art.

In accordance with one expedient further development in this regard, the DC voltage intermediate circuit has DC interrupters. Such DC interrupters are in the form of, for example, a conventional fuse, an explosive fuse or else an electronic switch. The DC voltage intermediate circuit advantageously comprises a plurality of DC branches, each DC branch, which may also be referred to as a power block, being monitored individually and being protected by the DC interrupters. A DC interrupter then makes it possible to selectively interrupt the respectively affected DC branch in the event of a fault, without operation of the other DC branches being impaired.

Each converter advantageously comprises power blocks connected in series. In accordance with the prior art, such power blocks are also referred to as power electronic building blocks and are known as such to those skilled in the art, with the result that no further details are required in this regard at this point. The power blocks allow for a modular design of the converters and thus for the converter to be matched to any desired voltage levels. The converters and the DC voltage intermediate circuit are thus expediently designed for medium voltages and for driving corresponding loads, the medium voltage range being between 1 kV and 52 kV.

In accordance with one expedient further development in this regard, each power block is connected to the DC voltage intermediate circuit via an interrupter unit. This makes it possible to replace a power block, without interrupting the connection between the remaining power blocks and the DC voltage intermediate circuit, which facilitates maintenance and servicing of the apparatus according to the invention.

Each load connection is advantageously connected to the DC voltage intermediate circuit via an inverter drive. Owing to the use of an inverter drive, it is possible to drive AC motors, in which case the drive frequency of the loads can be adjusted as desired.

In accordance with one preferred embodiment, the apparatus according to the invention has a first parallel converter, which is connected to the first connection and the first converter via a first connection branch, and a second parallel converter, which is connected to the second connection and the second converter via a second connection branch, the first parallel converter and the second parallel converter being connected to one another via a parallel circuit. In other words, in accordance with this further development, two back-to-back links can be corrected in parallel or preferably back-to-back in parallel between the first AC voltage system and the second voltage system. In this case, the parallel back-to-back link can be designed for lower voltages and therefore can have a more cost-effective design than the main back-to-back link. The parallel back-to-back link is, for example, a low-voltage back-to-back link having correspondingly designed converters. The parallel converters of the parallel back-to-back link are used in principle for providing an AC voltage for the first converter in the event of failure of the AC system, with the result that a power supply can even be provided when the first AC voltage system fails owing to faults. During normal operation and in the event of failure of the second AC voltage system, however, the parallel back-to-back link operates on no load. It is essential that, in the event of failure of or in the event of a fault in the first AC voltage system, the faulty first AC voltage system is latched with respect to the first parallel converter, i.e. with respect to the parallel back-to-back link.

Latching takes place, for example, by means of a switch, which is arranged between the first AC voltage system and the first parallel converter and the first converter. The switch provides, for example, the first connection. For normal operation, the parallel back-to-back link expediently has a droop characteristic which is less than the droop characteristic of the generators feeding to the first AC voltage system. Otherwise, the parallel back-to-back link would operate counter to the first AC voltage system, which is not latched with respect to the first converter during normal operation.

The second parallel converter advantageously has parallel DC voltage regulation for the purpose of regulating the DC voltage of the parallel DC voltage intermediate circuit. In accordance with an expedient further development in this regard, the first parallel converter has AC voltage regulation for the purpose of regulating the AC voltage in the first connection branch. The regulation of the first and second parallel converters, which are arranged in parallel with the first and second converters, is precisely the opposite of that of the first and second converters. This is of course connected to the purpose of the parallel back-to-back link, which is envisaged for providing a suitable AC voltage supply in the first connection branch if there is a fault in the latched first AC voltage system.

The first connection and/or the second connection are advantageously interrupting units. Interrupting units are, for example, switchgear assemblies or switches, which are known per se and can be connected to the AC voltage system. The switches may be mechanical switches or electronic switches.

The first converter and/or the first parallel converter are expediently connected to the first connection branch and the second converter in each case via a first transformer and/or the second parallel converter is expediently connected to the second connection branch in each case via a second transformer. In this manner, DC decoupling between the apparatus and the AC voltage systems is provided during operation. It is of course also possible in the context of the invention for parallel load connections to be connected to the parallel DC voltage intermediate circuit, it being possible for said parallel load connections to be connected to a load.

Further advantages result if AC voltage drives are connected upstream of the load connections. A connection of loads to the parallel load connection is suitable merely owing to the fact that the parallel back-to-back link operates virtually on no load during normal operation. If the first parallel converter and the second parallel converter are designed for lower voltages, loads which are also designed for corresponding voltages can be supplied with power in a redundant manner. The application possibilities of the apparatus according to the invention are therefore considerably increased.

The invention also relates to a system having a first AC voltage system and a second AC voltage system, and thus to an apparatus as summarized above.

Other features which are considered as characteristic for the invention are set forth in the appended claims.

Although the invention is illustrated and described herein as embodied in an apparatus for the redundant power supply of at least one load, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which identical reference symbols denote functionally or structurally identical components.

DESCRIPTION OF A PREFERRED EMBODIMENT OF THE INVENTION

Figure 1:
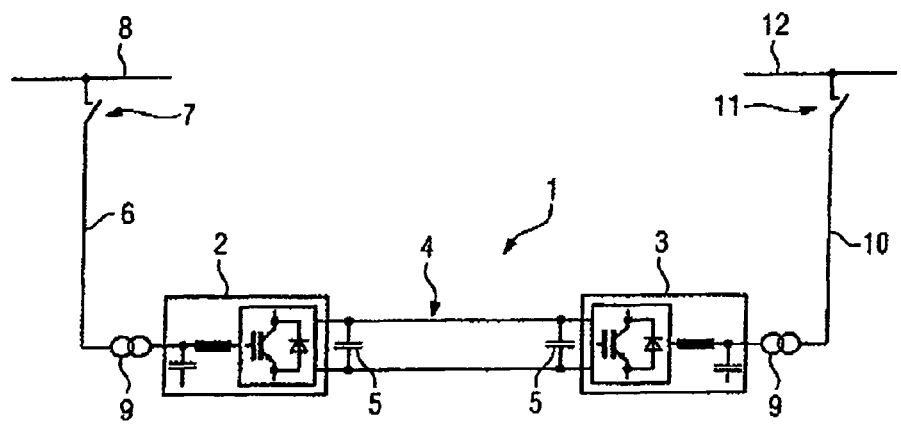
FIG. 1 shows a back-to-back link in accordance with the prior art for the purpose of coupling two AC voltage systems.

Referring now to the drawing figures in detail and first, particularly, to FIG. 1 thereof, there is shown a back-to-back link 1 in the form of an apparatus in accordance with the prior art. The previously known back-to-back link 1 has a first converter 2 and a second converter 3, which are connected to one another on the DC voltage side via a DC voltage intermediate circuit 4. The DC voltage intermediate circuit 4 comprises energy storage devices, in this case capacitors 5, for the purpose of maintaining the DC voltage. The design of the converters 2 and 3 is well known to those skilled in the art and, accordingly, no further details are required in this regard at this point. The converters 2 and 3 essentially comprise a 6-pulse bridge circuit having power semiconductors, in this case IGBTs, which can be switched off, a freewheeling diode which is connected in opposition is connected in parallel with each power semiconductor which can be switched off. The converter 2 is connected to a first switch 7 on the AC voltage side via a first connection branch 6. The switch 7 acts as the connection for connecting a first AC voltage system 8. A transformer 9 is provided for the purpose of inductively coupling the first converter 2 to the first AC voltage system 8 when the switch 7 is switched on.

The second converter 3 is likewise connected to a second switch 11, as the second connection, via a transformer 9 and a second connection branch 10. Owing to the switch 11 being switched on, the second converter 3 can therefore be inductively coupled to a second AC voltage system 12.

Expediently regulating the converters 2 and 3 allows for any desired power transfer from the first AC voltage system 8 to the second AC voltage system 12 or from the second AC voltage system 12 to the first AC voltage system 8. In the schematic illustration, the first and the second converters 2, 3 have capacitances and inductances, which are only illustrated schematically and whose wiring and manner of operation is likewise known to those skilled in the art.

Figure 2:
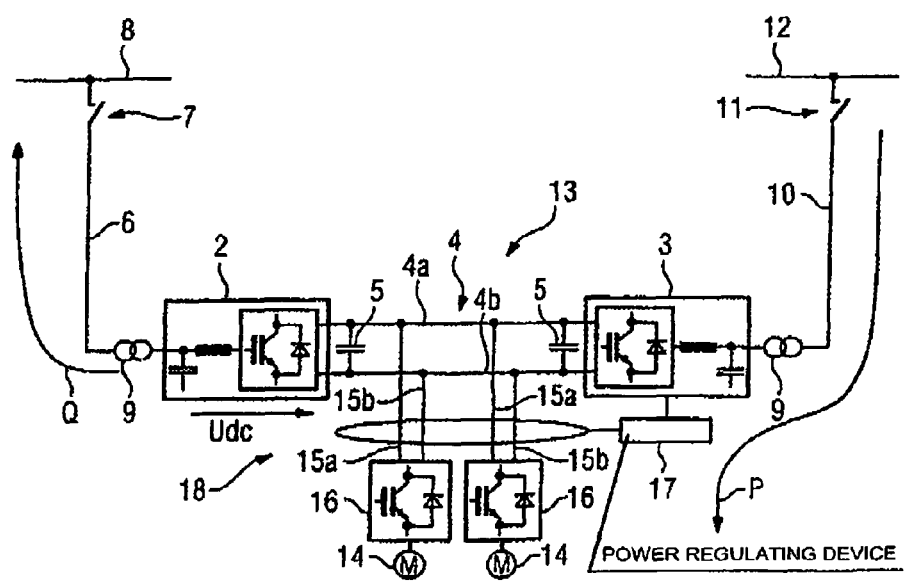
FIG. 2 shows a schematic illustration of one exemplary embodiment of the apparatus according to the invention.

FIG. 2 shows a schematic illustration of one exemplary embodiment of the apparatus 13 according to the invention. The apparatus 13 illustrated likewise has a first converter 2 and a second converter 3, which are connected to one another on the DC voltage side by a DC voltage intermediate circuit 4. The first converter 2 can be connected to a first AC voltage system 8 via a first connection branch 6 and via a first switch 7, whereas the second converter 3 can be coupled to a second AC voltage system 12 via a second connection branch 10 and a second switch 11. The AC voltage systems 8 and 12 each have a dedicated power supply, in this case in the form of a generator, and are implemented, inter alia, for supplying power to so-called thrusters 14, which are provided for the purpose of positioning a drilling vessel if the drilling vessel is undertaking drilling operations in deep waters. As has already been explained, thrusters are motors which can be altered in terms of their rotational speed and azimuth angle. Since even only a short-term failure of the power supply to these thrusters would result in high costs, a first AC voltage system 8 is provided in addition to the second AC voltage system 12, which, during normal operation, provides the power required by the thrusters 14, the intention being to change over to said first AC voltage power supply 8 if required.

For this purpose, the DC voltage intermediate circuit 4 is connected to two load connections. The connection between the DC voltage intermediate circuit and the load connections takes place by means of load connection lines 15a and 15b, which are DC connected to the positive connecting line 4a of the DC voltage intermediate circuit 4 or to the negative connecting line 4b of the DC voltage intermediate circuit 4. Two drive inverters 16 are connected upstream of the load connection and are designed for converting the DC voltage into an AC voltage. The drive inverters 16 as such are thus also very well known to those skilled in the art, with the result that no further details are required in this regard at this point. The drive inverters 16 produce an AC voltage or an alternating current having a desired voltage amplitude, phase angle and frequency.

The first converter 2 is controlled by means of DC voltage regulation, which adjusts a desired DC voltage, which is predetermined as the desired value for the regulation, in the DC voltage intermediate circuit 4. The DC voltage regulation is indicated schematically in FIG. 2 by the arrow labeled Udc. The DC voltage regulation also makes it possible to regulate the wattless power Q of the first AC voltage system 8. This is indicated in FIG. 2 by the arrow denoted Q.

The second converter 3, on the other hand, has a power regulating device 17, which is connected to measuring units 18 (shown schematically), the measuring units 18 comprising voltage transformers which produce an output signal which is in each case proportional to the direct current and/or the alternating current and the DC voltage and/or AC voltage and is sampled by a sampling unit so as to obtain sampled values and converted into digital DC values or DC voltage values by means of an analog-to-digital converter. The DC voltage regulation also has a parameterizable desired DC power, which is used as a desired value for the DC voltage regulation, on the basis of which the power semiconductors, in this case the IGBTs, of the second converter 3 are triggered such that the power predetermined by the desired DC power is transmitted by the second converter 3. In the context of the invention, a negative desired DC power is predetermined which corresponds, in terms of absolute value, to the power which is consumed by the thrusters 14. In other words, owing to the negative desired DC voltage, a power flow is provided in the direction of the arrow denoted P from the second AC voltage system 12 to the thrusters 14. The first AC voltage system 8, on the other hand, is used for maintaining the DC voltage Udc in the DC voltage intermediate circuit 4.

In the event of failure of the second AC voltage system 12, the first AC voltage system 8 takes over the supply of power to the thrusters 14, without a substantial time delay. In this case, despite the failure of the second AC voltage system 12, the DC voltage Udc in the DC voltage intermediate circuit is maintained by the first converter 2. However, in this case it is no longer possible for the wattless power to be controlled in the first AC voltage system 2.

However, if there is a fault in the first AC voltage system 8, it is no longer possible for the DC voltage in the DC voltage intermediate circuit 4 to be maintained. The power supply to the thrusters 14 is then interrupted.

Figure 3:
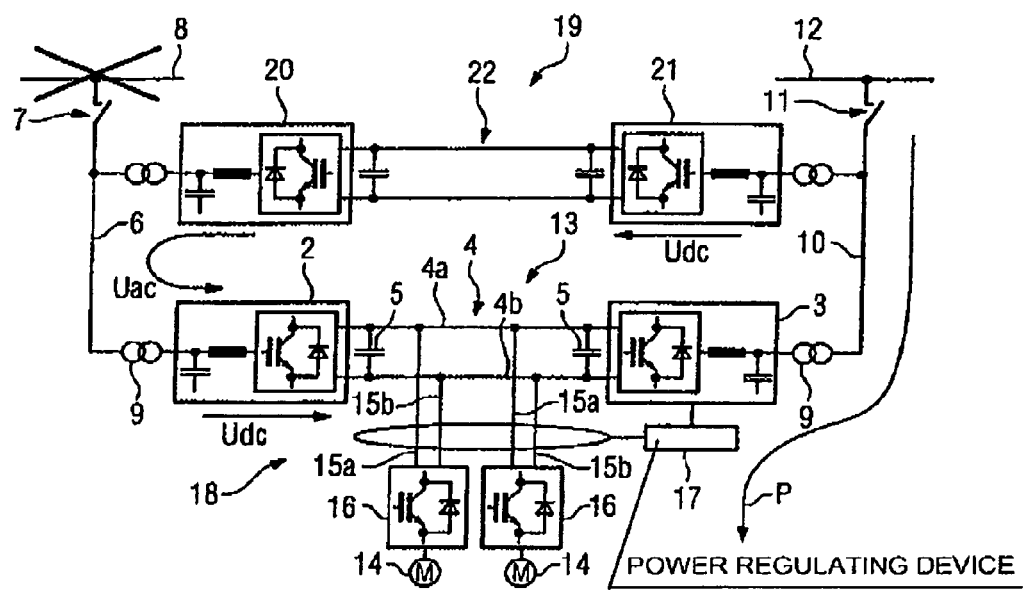
FIG. 3 shows a schematic illustration of a further exemplary embodiment of the apparatus according to the invention.

FIG. 3 shows one exemplary embodiment which ensures the power supply to the thrusters 14 even in the event of failure of the first AC voltage system 8. In the exemplary embodiment of the invention illustrated, a parallel back-to-back link 19 is to a certain extent connected back-to-back in parallel with the back-to-back link 13. For this purpose, a first parallel converter 20 is inductively coupled to the first connection branch 6 by means of a transformer 9. On the DC voltage side, the first parallel converter 20 is connected to a second parallel converter 21 via a likewise bipolar parallel DC voltage intermediate circuit 22. The second converter 21 is connected to the second connection branch 10 by means of the second transformer 9 and has parallel DC voltage regulation for the purpose of controlling the DC voltage of the parallel DC intermediate circuit 22, which is indicated merely by the arrow denoted Udc in FIG. 3.

The first parallel converter 20 has AC voltage regulation, which can be used to control an AC voltage which can be produced in the first connection branch 6. In this manner, the parallel back-to-back link 19 produces an AC voltage in the connection branch 6, which makes possible continued operation of the first converter 2 despite the failure of the first AC voltage system 8. The first switch 7 is used to latch the first AC voltage system 8 with respect to the first connection branch 6.

This makes it possible to supply power to the motors or thrusters 14 even when there is a fault in the first AC voltage system 8, as indicated by the cross in FIG. 3. However, it is important that the switch 7 is open in the event of a fault in order to decouple the first AC voltage system 8 from the first connection 6 and thus from the first converter 2. For frictionless normal operation it is also necessary to take care that the droop characteristic of the voltage regulation by means of the first parallel converter 20 is less than the droop characteristic of the generators (not illustrated in the Figs.) feeding to the first AC voltage system 8. Otherwise, the first parallel converter 20 would operate counter to the first AC voltage system 8. However, this is undesirable.

The parallel back-to-back link 19 and the back-to-back link 13 may be designed for any desired voltage ranges. In the exemplary embodiments illustrated in the Figs., the back-to-back link 13 is designed for the medium-voltage range, i.e. for voltages between 1 kV and 52 kV, whereas the parallel back-to-back link 21 is designed for the low-voltage range. This makes redundant driving possible both for relatively large loads or motors 14 and for relatively small loads or motors 24, 25. Merely for reasons of completeness, reference is made to the fact that the costs of a parallel back-to-back link 19 designed for low voltages are lower than for the back-to-back link 13, which is designed for medium voltages.

Figure 4:
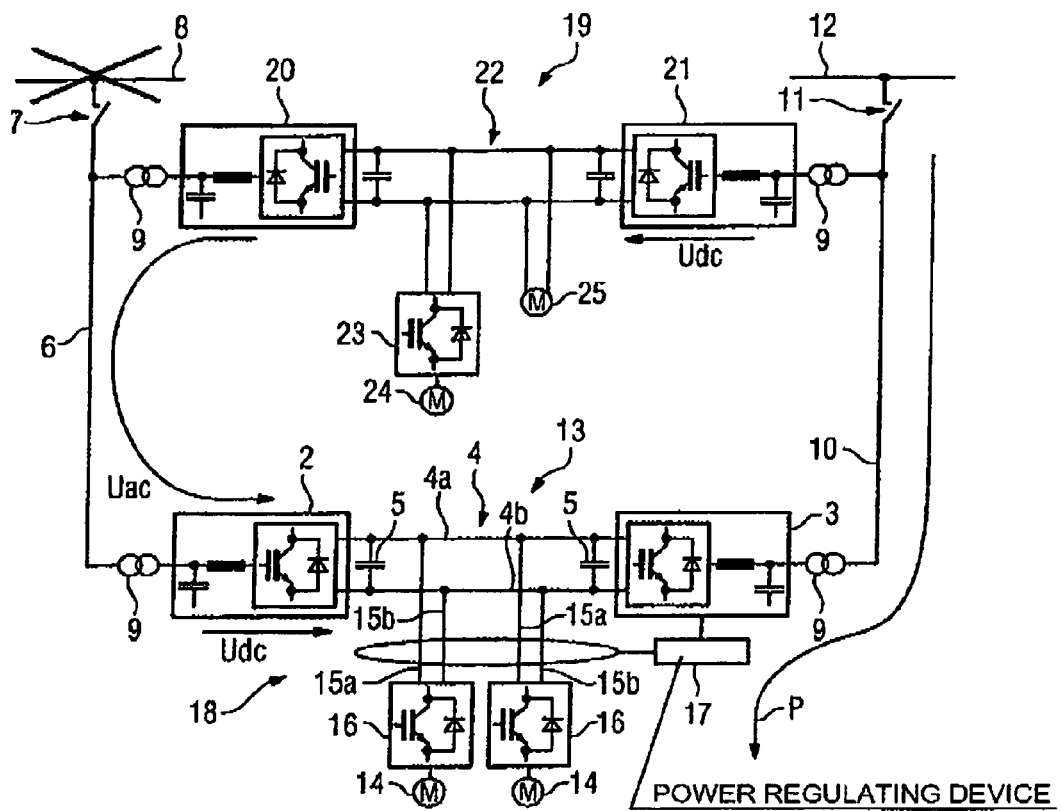
FIG. 4 shows a schematic illustration of a further exemplary embodiment of the apparatus according to the invention.
Figure 5:
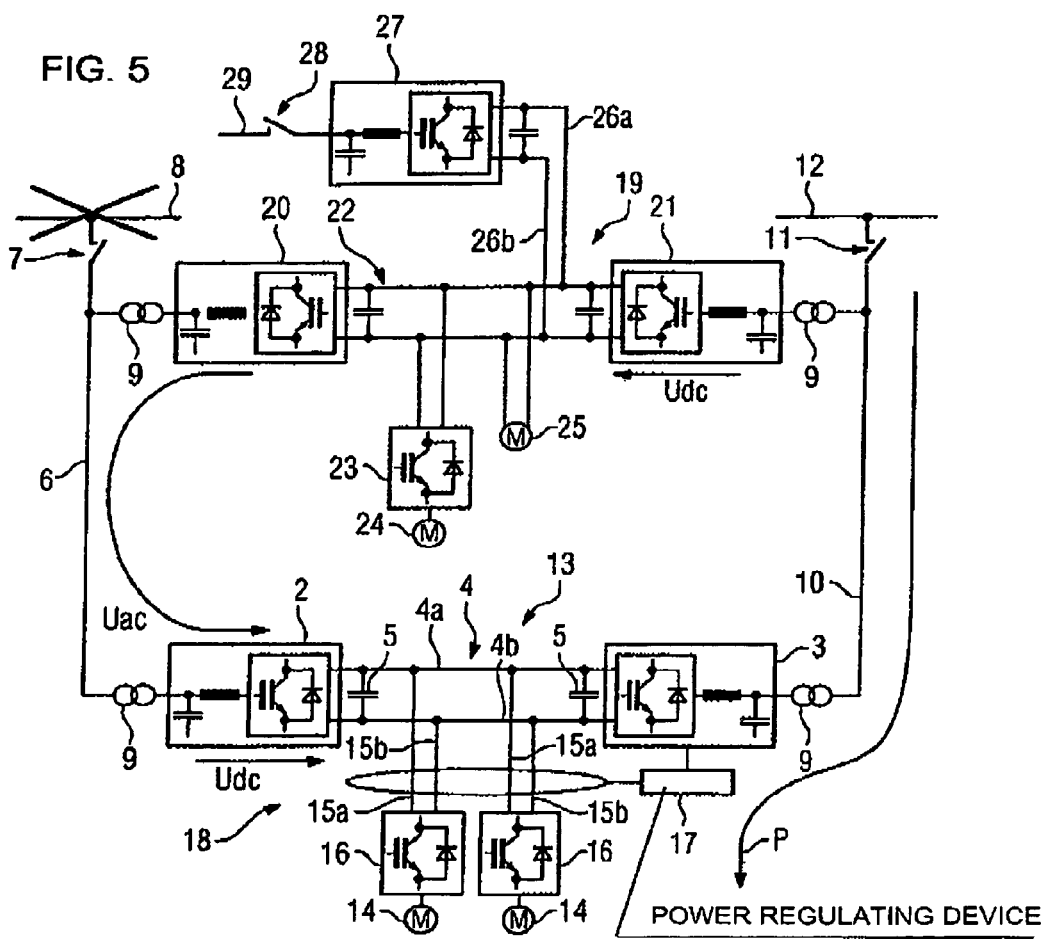
FIG. 5 shows a schematic illustration of a further exemplary embodiment of the apparatus according to the invention.

FIG. 4 shows one further exemplary embodiment of the apparatus according to the invention, in which a parallel load connection (not illustrated in the Figs.) is connected to the parallel circuit 22, a parallel drive inverter 23 for the purpose of driving an additional load 24 being connected upstream of said parallel load connection. In addition, a DC voltage motor 25 is connected directly to the parallel DC voltage intermediate circuit 22. FIG. 5 shows a further exemplary embodiment of the apparatus according to the invention, which largely corresponds to the exemplary embodiment shown in FIG. 4 further emergency converter, which is connected on the DC side In this case, however, the parallel DC voltage intermediate circuit 22 is connected to an emergency converter 27 on the DC voltage side via DC voltage lines 26a and 26b, the emergency converter 27 being connected to an AC voltage-carrying emergency power supply system 29 on the AC voltage side via an emergency switch 28. A to the DC voltage intermediate circuit 4 and on the AC voltage side to a further emergency power supply system or to the same emergency power supply system 29, is not illustrated in the Figs. for reasons of clarity. The emergency power supply system 29 or the emergency power supply systems further reduce (s) the probability of the power supply for the loads failing. The first and second AC voltage systems and the emergency power supply system(s) may have any desired number of phases, independently of one another, in the context of the invention.

Figure 6:
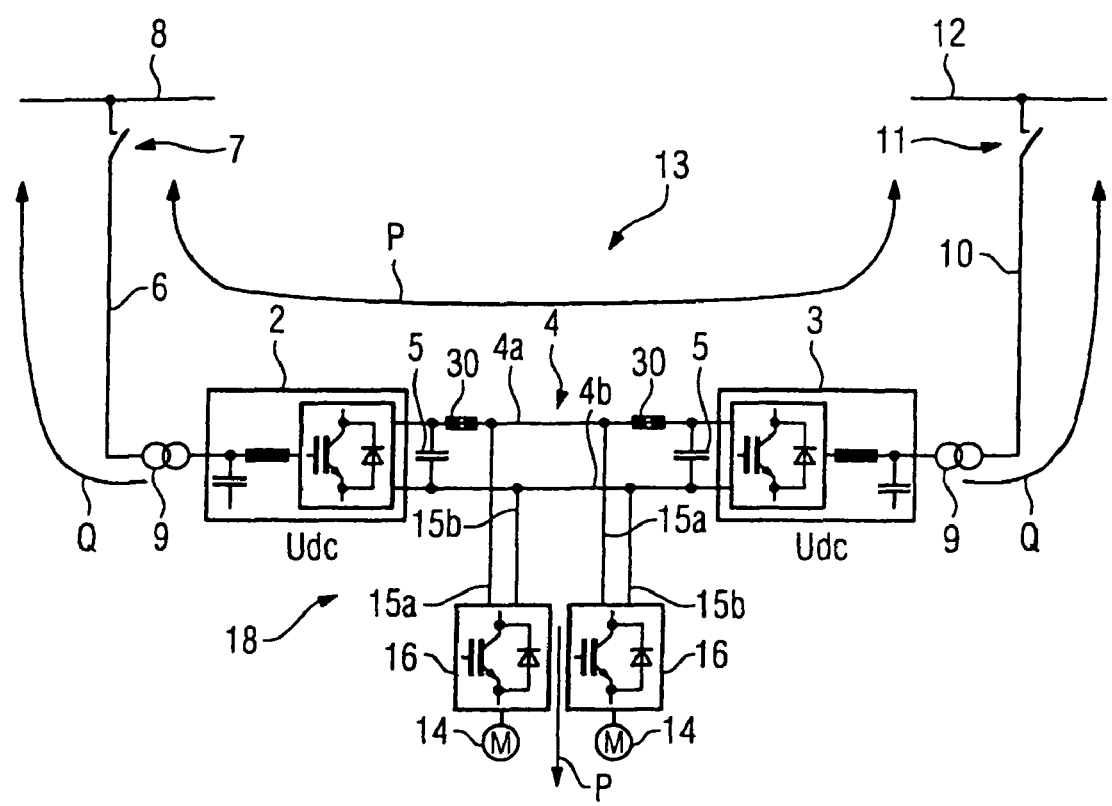
FIG. 6 shows a schematic illustration of a further exemplary embodiment of the apparatus according to the invention.

FIG. 6 shows a further exemplary embodiment, which essentially corresponds to the exemplary embodiments illustrated in FIG. 2, but in which the second converter 3 likewise has DC voltage regulation, which is independent of the DC voltage regulation of the first converter 2. In this case, the first converter 2 and the second converter 3 are regulated in a manner such that the converters 2 and 3 are prevented from influencing one another, for example owing to oscillations in the DC voltage intermediate circuit 4. The converters 2 and 3 have, for example, a modular design and have power blocks, which are also referred to as power electronic building blocks. Power electronic building blocks are known as such to those skilled in the art, with the result that no further details are required in this regard at this point.

For reasons of safety, the DC voltage intermediate circuit 4 has interrupter units 30 in the exemplary embodiment illustrated, these interrupter units 30 causing the current flow in the DC voltage intermediate circuit 4 to be interrupted in the event of a fault. The interrupter units 30 are, for example, fuses, electric switches or the like.

Figure 7:
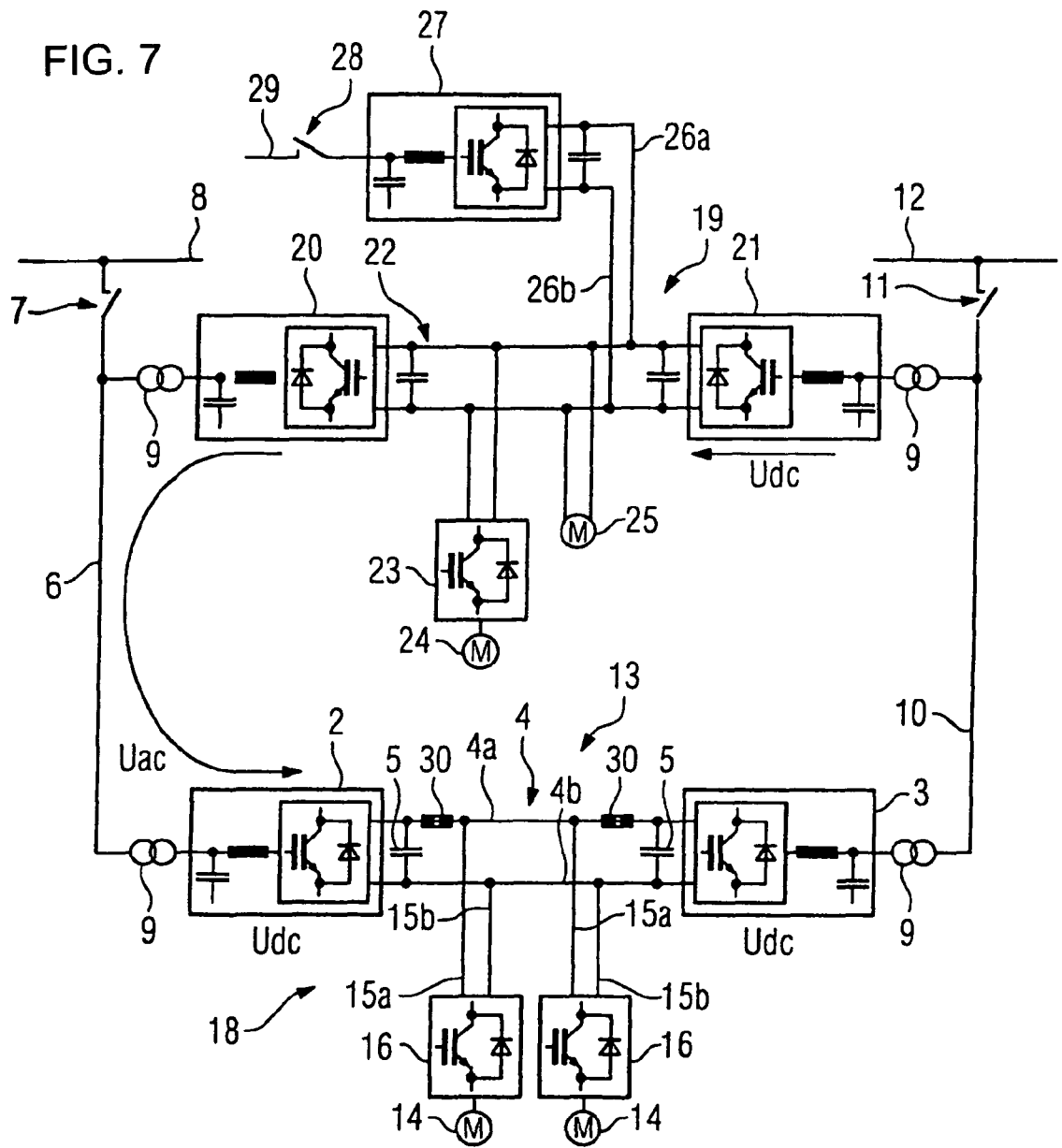
FIG. 7 shows a schematic illustration of a modified version of the exemplary embodiment shown in FIG. 6.

FIG. 7 shows the exemplary embodiment shown in FIG. 6, but in which an additional parallel back-to-back link 19, which is connected back-to-back in parallel, is provided for the purpose of supplying power to smaller loads 24, 25, as in FIG. 4. The converters 2, 3 of the back-to-back link 13 are regulated as explained in connection with the exemplary embodiment shown in FIG. 6. The parallel back-to-back link 19 is regulated as explained in connection with the exemplary embodiment shown in FIG. 4, in which case an emergency converter 27, which can be connected to an emergency power supply system 29, is again provided for both back-to-back links 13, 19.

This application claims the priority, under 35 U.S.C. §119, of German patent application No. 10 2005 047 686.6, filed Sep. 23, 2005; the entire disclosure of the prior application is herewith incorporated by reference.

We claim:

1. An apparatus for the redundant power supply of at least one load, comprising:
   a first converter selectively connectible to a first AC voltage system via a first connection;
   a second converter selectively connectible to a second AC voltage system via a second connection;
   said first and second converters including power semiconductors that can be switched off; and
   a DC voltage intermediate circuit connected between said first converter and said second converter on a DC voltage side thereof, said DC voltage intermediate circuit having at least one load connection for supplying power to a load;
   wherein said second converter is configured for power regulation for regulating a power flow via said second converter, with the power being regulated to a negative desired DC power corresponding to an absolute value of the power consumed by all loads connected to the apparatus.

2. The apparatus according to claim 1, wherein said first converter is configured for first DC voltage regulation for regulating a DC voltage of said DC voltage intermediate circuit.

3. The apparatus according to claim 1, wherein said second converter is configured for second voltage regulation for regulating the voltage in said DC voltage intermediate circuit.

4. The apparatus according to claim 3, which further comprises a DC interrupter circuit connected in said DC voltage intermediate circuit.

5. The apparatus according to claim 1, wherein each said converter comprises power blocks connected in series.

6. The apparatus according to claim 5, wherein each said power block is connected to said DC voltage intermediate circuit via an interrupting unit.

7. The apparatus according to claim 1, wherein each said load connection is connected to said DC intermediate circuit via an inverter drive.

8. The apparatus according to claim 1, which comprises:
   a first parallel converter connected to said first connection and said first converter via a first connection branch;
   a second parallel converter connected to said second connection and said second converter via a second connection branch; and
   a parallel DC voltage intermediate circuit connecting said first parallel converter and said second parallel converter to one another.

9. The apparatus according to claim 8, wherein said second parallel converter is configured for parallel DC voltage regulation for regulating a DC voltage of said parallel DC voltage intermediate circuit.

10. The apparatus according to claim 8, wherein said first parallel converter is configured for AC voltage regulation for regulating an AC voltage in said first connection branch.

11. The apparatus according to claim 8, wherein said parallel DC voltage intermediate circuit includes at least one parallel load connection for connecting an additional load.

12. The apparatus according to claim 8, wherein said first converter and said first parallel converter are connected to said first connection branch via a first transformer, said second converter and/or said second parallel converter is connected to said second connection branch via a second transformer.

13. The apparatus according to claim 8, which comprises an emergency converter for selectively connecting said DC voltage intermediate circuit to an AC voltage-carrying emergency power supply system.

14. The apparatus according to claim 1, wherein at least one of said first connection and said second connection is an interrupting unit.

15. The apparatus according to claim 1, wherein said first converter and said second converter allow for any desired power transfer from the first AC voltage system to the second AC voltage system.

16. A system, comprising:
   a first AC voltage system;
   a second AC voltage system; and
   an apparatus according to claim 1 connected to said first and second AC voltage systems.

17. The system according to claim 16, wherein said first converter and said second converter allow for any desired power transfer from said first AC voltage system to said second AC voltage system.

\* \* \* \* \*